(12) United States Patent
Montgomery (10) Patent No.: US 8,005,778 B2
(45) Date of Patent: Aug. 23, 2011

(54) MODULAR SYSTEM FOR OPTIMIZING KNOWLEDGE YIELD IN THE DIGITAL WORKPLACE

(76) Inventor: Mark Montgomery, Dewey, AZ (US)

( * ) Notice: Subject to any disclaimer, the term of this patent is extended or adjusted under 35 U.S.C. 154(b) by 1099 days.

(21) Appl. No.: 11/735,329

(22) Filed: Apr. 13, 2007

(65) Prior Publication Data

US 2007/0250539 A1 Oct. 25, 2007

Related U.S. Application Data

(62) Division of application No. 11/735,329, filed on Apr. 13, 2007.

(60) Provisional application No. 60/745,443, filed on Apr. 24, 2006.

(51) Int. Cl.
*G06F 17/00* (2006.01)
*G06N 5/02* (2006.01)
(52) U.S. Cl. .............................. 706/47; 706/45; 706/19
(58) Field of Classification Search .................. None
See application file for complete search history.

(56) References Cited

U.S. PATENT DOCUMENTS 6,278,977 B1 * 8/2001 Agrawal et al. .................. 705/7

OTHER PUBLICATIONS

Marinescu et al., D., "Internet-Based Workflow Management: Towards a Semantic Web", John Wiley & Sons, 2002.*
Grefen et al., P., "CrossFlow: Cross-Organizational Workflow Management for Service Outsourcing in Dynamic Virtual Enterprises", IEEE, pp. 52-57, 2001.*
Jablonski, S., "MOBILE: A Modular Workflow Model and Architecture", pp. 1-30, Sep. 1994.*
Bussier, C., "Enterprise-Wide Workflow Management", IEEE Concurency, pp. 32-43, Jul.-Sep. 1999.*
Georgakopoulos et al., D., "An Overview of Workflow Management: From Process Modeling to Workflow Automation Infrastructure", Distributed and Parallel Databases, 3, pp. 119-153, 1995.*

* cited by examiner

*Primary Examiner* — Jeffrey A Gaffin
*Assistant Examiner* — Adrian Kennedy (57) ABSTRACT

A networked computer system, architecture, and method are provided for optimizing human and intellectual capital in the digital workplace environment.

8 Claims, 8 Drawing Sheets

| CKO Module |||||
|---|---|---|---|---|
| Create/Edit Modules | Action | Type | Edit Administrator ||
| R&D Prototype | Edit | Project | Browse Directory ||
| Finance and Accounting | Rename | CKO Suite | Browse Directory ||
| Spectrum Standards | Store | Partnership | Browse Directory ||
| Insert name here..... | New | Individual | Browse Directory ||

| Create/Edit Mandatory Messengers (Real Time) | Select/Change Administrator ||
|---|---|---|
| Office of CEO | Browse Directory ||
| Office of Corporate Communications | Browse Directory ||
| Chief Knowledge Officer | Browse Directory ||
| Insert Name Here.... | Browse Directory ||

| Edit Global Course (All Kyield members) | Max. Weekly Vol. | Min. Quality Rating | Delivery Date | Delivery Time | Mandatory |
|---|---|---|---|---|---|
| Customer relations | 10 | 1 | Daily / Sunday / Monday / Tuesday | Real Time / 8 AM / 9 AM / 10 AM | ☑ |
| Industry news | 5 | 7 | Daily / Sunday / Monday / Tuesday | Real Time / 8 AM / 9 AM / 10 AM | ☑ |
| Skills training | 5 | 8 | Optimal / Sunday / Monday / Tuesday | Real Time / 8 AM / 9 AM / 10 AM | ☑ |
| Insert name here.... | 1 | 1 | Daily / Sunday / Monday / Tuesday | Real Time / 8 AM / 9 AM / 10 AM | ☐ |

Update CKO Module

Labels: 14, 15, 16, 17, 18, 19, 20, 21, 22

FIG. 4

| | Business Group Module | | | | |
|---|---|---|---|---|---|
| Optimize your BG course | Max. Weekly Volume | Min. Quality Rating | Delivery Date | Delivery Time | Mandatory |
| Country Cultural Relations | 7 | 1 | Sunday / Monday / Tuesday | Real Time / Optimal / 8 AM / 9 AM | ☑ |
| Manufacturing Best Practices Forum | 5 | 7 | Daily / Sunday / Monday / Tuesday | Real Time / Optimal / 8 AM / 9 AM | ☐ |
| Industry Best Practices Forum | 5 | 9 | Daily / Sunday / Monday / Tuesday | Real Time / 8 AM / 9 AM | ☐ |
| BG Corporate Education | 3 | 8 | Daily / Sunday / Monday / Tuesday | Real Time / 8 AM / 9 AM | ☐ |

| Create/Edit Modules | Action | Type | Edit Members |
|---|---|---|---|
| Exploratory 1 | New | Project | Browse Directory |
| Country Cultural Relations | Edit | Business Group | Browse Directory |
| Insert name here.... | New | Individual | Browse Directory |

Update Business Group Module

23 — (points to Business Group Module header)
24 — (points to course rows)
25 — (points to Edit Members section)

FIG. 5

| Individual Module, Consumption | | | |
|---|---|---|---|
| Create Your Course | Max. Weekly Volume | Min. Quality Rating | Messaging Settings |
| ------Topic A Journals------<br>Journal #1 (84)<br>Journal #2 (69)<br>Journal #3 (63) | 0 | 0 | ----Volume---- |
| ------Topic B Journals------<br>Journal #1 (84)<br>Journal #2 (69)<br>Journal #3 (63) | 0 | 0 | ----Quality---- |
| ---Interdisciplinary Publications---<br>Publication #1 (76)<br>Publication #2 (66)<br>Publication #3 (70) | 0 | 0 | ---Advanced Settings--- |
| ------Technical Journals------<br>Journal #1 (73)<br>Journal #2 (74)<br>Journal #3 (66) | 0 | 0 | ------Approval Options------<br>Transfer my social network<br>Transfer my address book<br>Build new with Kyield |
| ------Industry Publications------<br>Publication #1 (64)<br>Publication #2 (69)<br>Publication #3 (72) | 0 | 0 | ------Distribution------<br>Include RSS<br>Include email<br>Include my work PC |
| ------Highest Rated R&D------<br>Artificial Intelligence<br>Biomedical<br>Computing | 0 | 0 | ------File Types------<br>Deliver text only with links<br>Deliver documents only<br>Deliver all approved types |
| Add Content | Update Individual Consumption | | View All Courses |

FIG. 6

Individual Metrics

| By Activity (Estimated averages) | Hours Weekly | Portion of Work | Volume Weekly | Average Rating | Kyield Quotient |
|---|---|---|---|---|---|
| Reading Publications | 11 | 15% | 24 | ▓▓ | 78 |
| Crafting Publications | 7 | 9% | 3 | 78 | 78 |
| Reading Emails | 16 | 21% | ▓▓ | 72 | 66 |
| Writing Emails | 13 | 17% | ▓▓ | ▓▓ | 71 |
| Developing IP | 7 | 9% | 8 | ▓▓ | ▓▓ |
| Searching | 6 | 8% | 49 | 79 | 63 |
| Totals | ▓▓ | 87% | ▓▓ | 75 | 77 |

| By Project (Actual ratings) | Hours Weekly | Portion of Work | Volume Weekly | Average Rating | Kyield Quotient |
|---|---|---|---|---|---|
| Project A | 21 | 32% | 112 | 45 | 64 |
| Project B | 15 | 23% | 73 | 82 | ▓▓ |
| Project C | 15 | 23% | 73 | 82 | 71 |
| Mentor | 7 | 11% | 14 | ▓▓ | ▓▓ |
| Totals | 36 | 100% | ▓▓ | 75 | 79 | color key: red = crisis - yellow = caution - blue = exceptional - green = thought leader

FIG. 7

Individual Ratings

The rating formula employed is simple averaging ⟵ 43

| Work products<br>add work products | Work<br>Groups | Peer<br>Groups | Master<br>Reviewers | Self<br>Assess | Total<br>Averages |
|---|---|---|---|---|---|
| Publications | 61 | 76 | 75 | 78 | 78 |
| Email messaging | 72 | 69 | 64 | 60 | 66 |
| Communities of practice | 90 | 92 | 88 | 85 | 89 |
| Patents & IP | 73 | 77 | 89 | 91 | 83 |
| Conferences | 64 | 68 | 65 | 58 | 64 |
| Totals | 76 | 76 | 76 | 74 | 76 |

Individual Project Module

| My Current Projects | My Role | Project Type | Project Scope | Project Tasks | Team Members | Project Schedule | Ave Rating |
|---|---|---|---|---|---|---|---|
| Project A | Leader | Project | View/Edit | View/Edit | View/Edit | View/Edit | 46 |
| Project B | Co-Investigator | Partnership | View | View | View | View | 82 |
| Project C | Sr. Scientist | Project | View | View | View | View | 82 |
| Project D | Mentor | Project | View/Edit | View/Edit | View/Edit | View/Edit | 90 |

| Propose New Project | My Role | Type | Propose Team |
|---|---|---|---|
| insert name here... | Leader | Partnership | Create List |

Update Project Module 46, 45, 47, 48 ered to digital form is simple to copy and distribute, providing disincentives for creative problem solving, the sharing of knowledge and intellectual property, and therefore improving work quality.
MODULAR SYSTEM FOR OPTIMIZING KNOWLEDGE YIELD IN THE DIGITAL WORKPLACE

CROSS-REFERENCE TO RELATED APPLICATIONS

This application is a divisional of U.S. application Ser. No. 11/735,329 filed Apr. 13, 2007, which in turn claims priority of U.S. Provisional Application Ser. No. 60/745,443, filed Apr. 24, 2006. This application claims only subject matter disclosed in the parent application and therefore presents no new matter.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright. 2007, Mark A. Montgomery.

FIELD OF THE INVENTION

The invention relates to the management of human intellectual capital within computer networked organizations, and more particularly to managing the quantity and quality of digital work flow of individual knowledge workers and work groups for the purpose of increasing knowledge yield, or output.

BACKGROUND OF THE INVENTION

The volume of data transfer and related human consumption of information is growing exponentially in the network era, resulting in a condition commonly referred to as information overload. The result for the modern organization is an ever increasing challenge to manage the quantity and quality of information being transferred, consumed, and stored within computer networks.

Enormous amounts of structured and unstructured information is being consumed by knowledge workers that is redundant or irrelevant to the knowledge worker's job, or the mission of the organization, creating serious challenges for organizations while reducing the return on investment for information technologies and knowledge workers.

Systems deployed previously attempting to reduce information overload and increase knowledge worker productivity have been designed primarily to address either the symptoms of the problem, or a specific portion thereof; including desktop productivity suites, higher performance search engines, and reducing unsolicited e-mail.

In recent years, computer standards bodies have been approaching the challenge by improving machine to machine automation and structure to documents with XML, RDF, SOAP, and OWL, commonly referred to as the Semantic Web.

Emerging positions within networked organizations attempting to optimize the digital workplace include the Chief Knowledge Officer (hereinafter "CKO") who is responsible for improving the value of human and intellectual capital to better achieve the organization's mission.

Despite these individual and collective efforts, the problems associated with information overload continue to grow exponentially. According to research firms IDC and Delphi Group, the average knowledge worker spends about a quarter of his or her day looking for information.

A related serious problem for knowledge workers affecting productivity and innovation is that intellectual property converted to digital form is simple to copy and distribute, providing disincentives for creative problem solving, the sharing of knowledge and intellectual property, and therefore improving work quality.

Given the complexities of the digital workplace environment, it would be beneficial for organizations to employ a holistic metadata system including modules to manage the knowledge yield for the entire organization, for each work group within the organization, and each individual member of the organization so they can continually optimize his/her knowledge yield for the continuously changing work environment.

BRIEF SUMMARY OF THE INVENTION

The present invention fills these needs by providing a holistic system of software modules that conjoins with human knowledge workers, productivity software programs, and communications systems to optimize the quality and quantity of information consumption for each individual member.

An object of the invention is to provide a pre-deployment survey collecting precise data on the technical, operating, and regulatory environment of the subject organization, the results of which are then input as initial system settings.

Another object of the invention is to provide a module that manages the predetermined quality and quantity of digital work flow for an entire organization, or group of organizations.

Another object of the invention is to provide a module that further manages the quality and quantity of digital work flow for a business unit, division, or other large group of individuals.

Another object of the invention is to provide a module that further manages the quality and quantity of digital work flow for each individual member.

Another object of the invention is to input a metadata wrapper file describing the specific relationships and attributes of each file entered into the system.

Another object of the invention is to require a human reviewer to evaluate each digital file prior to inputting into the system's rated knowledge base.

Another object of the invention is to display a graphic chart that provides numeric summaries of the individual member's digital work with color coded highlights of areas needing improvement or deserving recognition, thus providing the option to reward exceptional original work.

Another object of the invention is to index the system metadata files so that search queries can be returned according to Semantic relationships, attributes, and values.

BRIEF DESCRIPTION OF THE DRAWINGS

The methods and systems for optimizing knowledge yield in the digital workplace are further described with reference to the accompanying drawings in which.

DETAILED DESCRIPTION OF THE INVENTION

The present invention is based on the idea that organizations and knowledge workers would be more efficient in their digital work flow with a holistic architecture that applies metadata to each digital file entered into the system, which can then be controlled in a precise manner through layering of modules to optimize the quality and quantity of digital work produced and consumed, thus providing a method for managing knowledge yield for individuals, groups, and organizations.

The following discussion is intended to provide a brief description of an organization's computing work environment in which the invention may be implemented in the preferred manner. It should be understood, however, that wireless, portable and other computing devices are contemplated for use in connection with the present invention. It is further contemplated that the present invention could be employed in a public version accessible within the Internet and World Wide Web, a private version within an Intranet or Extranet, or some combination thereof. Therefore, the description the embodiments that follow is for the purpose of illustration and not limitation.

The knowledge worker in the modern computer work environment experiences high volumes of incoming disparate data from multiple sources and networks, which can then be viewed in one or more computing devices (not shown).

Figure 1:
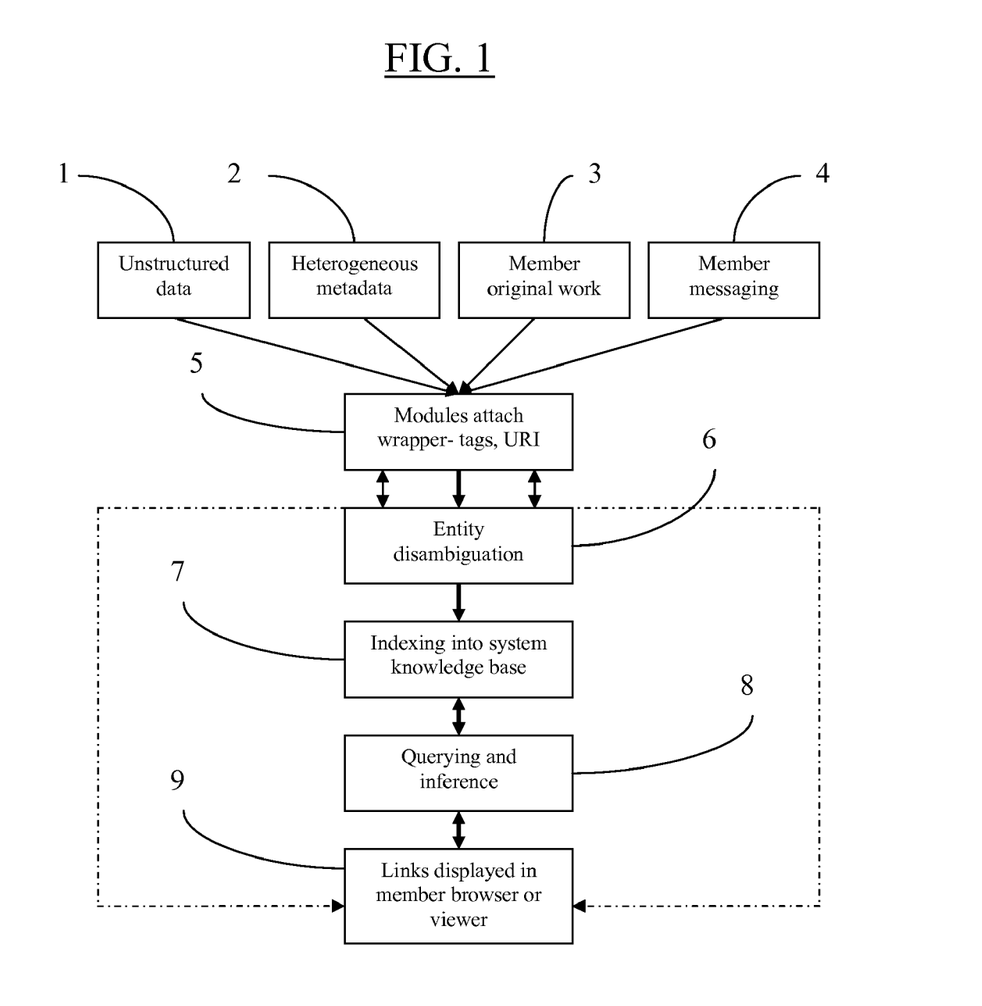
FIG. 1 is a flowchart illustrating the process and data flow in accordance with the invention.

FIG. 1 depicts the process for dataflow through the invention system, which includes unstructured data 1, heterogeneous metadata 2, member original work 3, and member messaging 4, which could be unstructured or structured, or some combination thereof. Each individual member subscribed to the system is provided a software module 5 that is used in conjunction with a computing device in part to input metadata describing the relationships, attributes, and values of each file entered into the system.

Each file processed for entity disambiguation 6, which can scan the file for pre-existing metadata in languages such as RDF or OWL for example, before indexing into the knowledge base 7.

By attaching a detailed metadata wrapper to each system file 5, and processing to disambiguate the entity 6 for Semantic reduction, the system knowledge base is indexed 7 for high value returns in querying and inference 8 of the databases, which then returns metadata descriptions and network links to be displayed 9 in the module, browser, or other viewer for retrieval, consumption, and application of additional metadata if deemed of value by the member.

Figure 2:
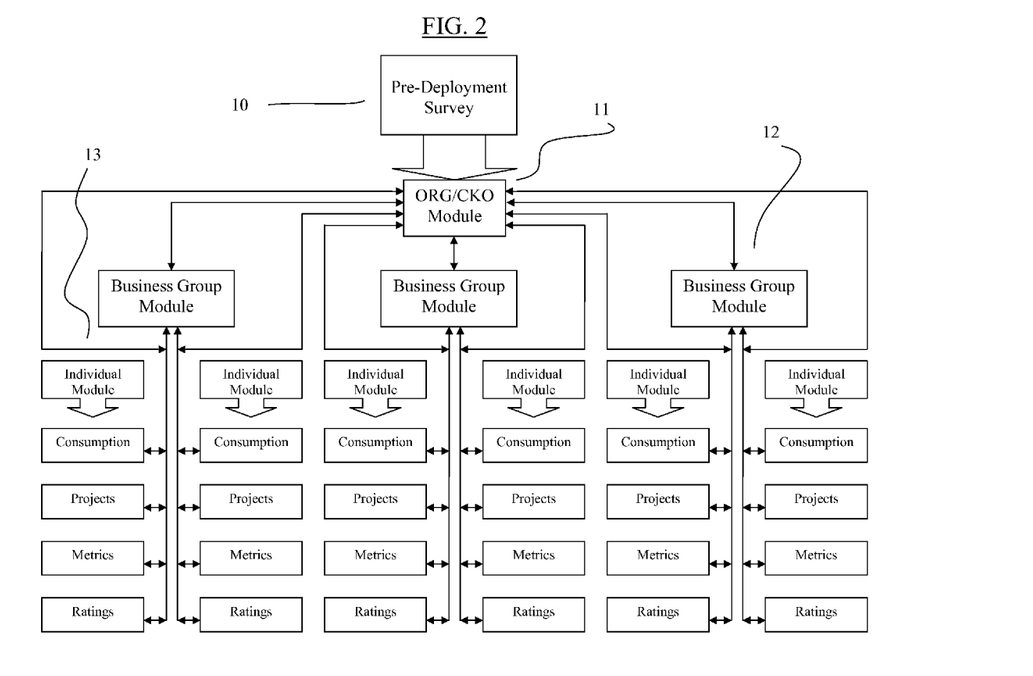
FIG. 2 is a flowchart illustrating the modular system architecture in accordance with the invention.

FIG. 2 illustrates the modular system architecture from the execution of the pre-deployment survey 10, which is the method of obtaining and inputting into the system specific data on the subject organization's operational, regulatory, and technical restrictions, which provides the initial default settings in the CKO module 11.

In the preferred method, the CKO module is the tool by which organization management sets the system security parameters, administrative permissions, and mandatory messaging for the system, including for the business group modules 12. Each business group module 12 is the preferred method for further defining the quality and quantity of data according to the group objective for each individual module 13, which includes components for each member to further tailor their information consumption, manage the data flow relating to their work projects, review their performance metrics, and view their system ratings.

ILLUSTRATIVE EXAMPLE

Figure 3:
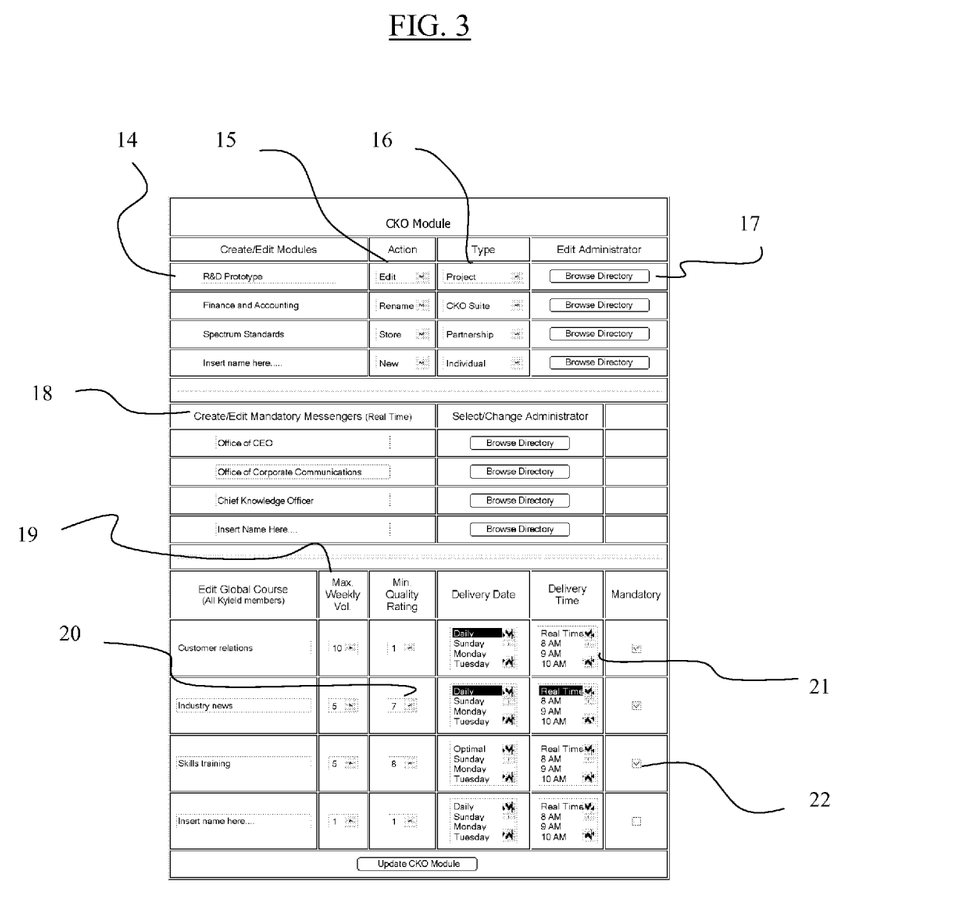
FIG. 3 is a screen capture showing the CKO module in which the present invention may be implemented.

FIG. 3 displays a screen capture of the CKO module, which allows the administrator to create additional modules 14 with the action options of new, edit, store, or rename 15, select type of module 16, and select administrators from the system administrator database (not shown).

In addition to managing system-wide mandatory messengers 18, the CKO module is used to create and manage system-wide courses by topic, pre-determined maximum volume 19, and minimum quality 20, exemplified as 1 being the lowest value and 10 being the highest. The course delivery time and date 21 is an option that reduces the common bandwidth bottleneck problem in large data networks. The mandatory 22 selection is made available for regulatory and other essential messaging.

Figure 4:
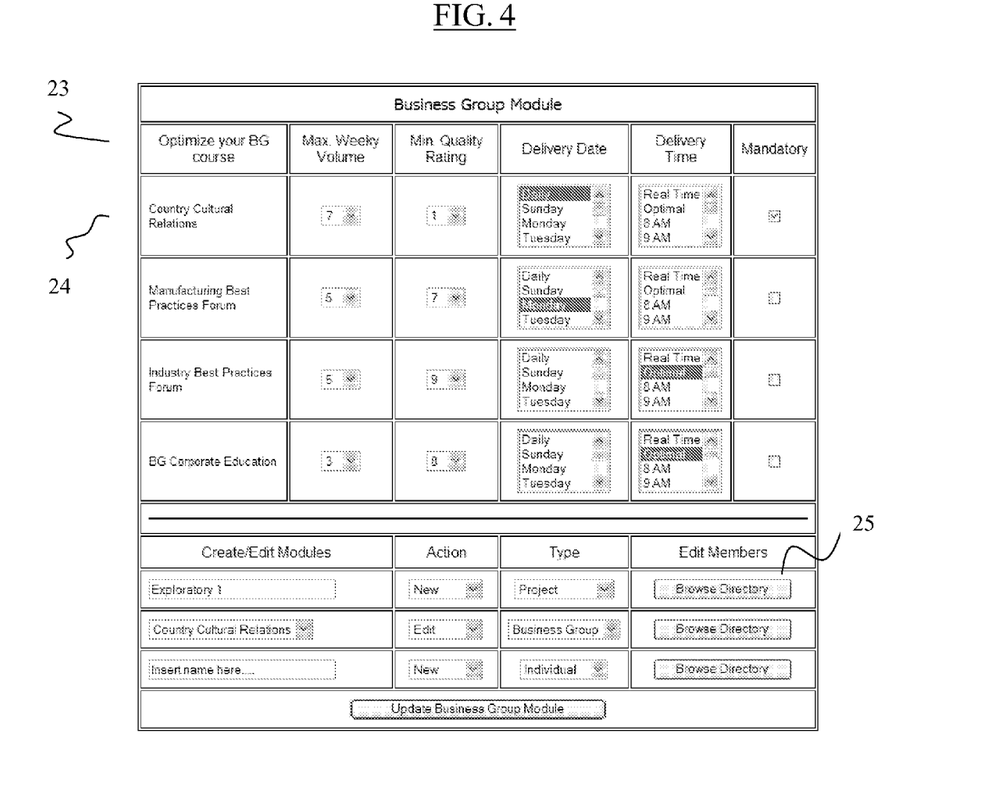
FIG. 4 is a screen capture showing the business group module in which the present invention may be implemented.

FIG. 4 is a screen capture of a business group module, which is created with the CKO module (14), exemplified herein in simple generic form, sharing the same functions as the parent module, with the exceptions, however, of optimizing courses for the specific business group objectives 23, such as country cultural relations 24, and has the ability to edit specific individual subscribers for each course 25.

Figure 5:
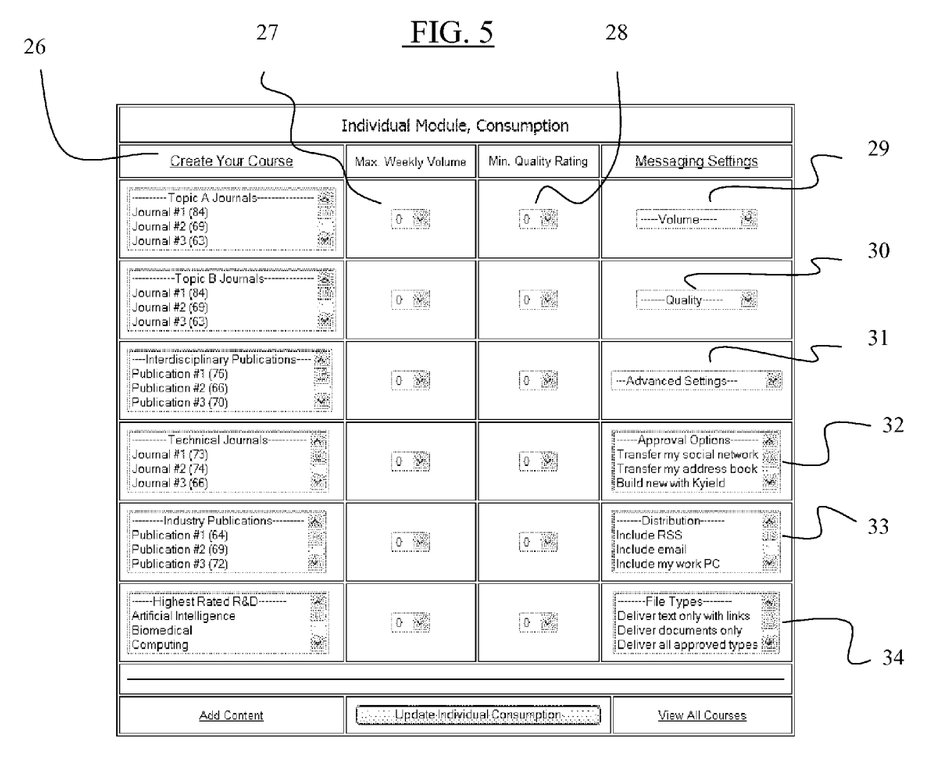
FIG. 5 is a screen capture showing the individual consumption module in which the present invention may be implemented.

FIG. 5 is a screen capture of a generic module provided to each individual member within the system. The individual consumption module can be created with either the CKO module (FIG. 3) or the Business Group module (FIG. 4). Similarly to the parent module, the individual module can be used to create courses 26 with the same ability to manage volume 27 and quality 28. Additionally, however, under messaging settings the individual can increase or decrease both volume 29 and quality 30 by percentages.

Figure 6:
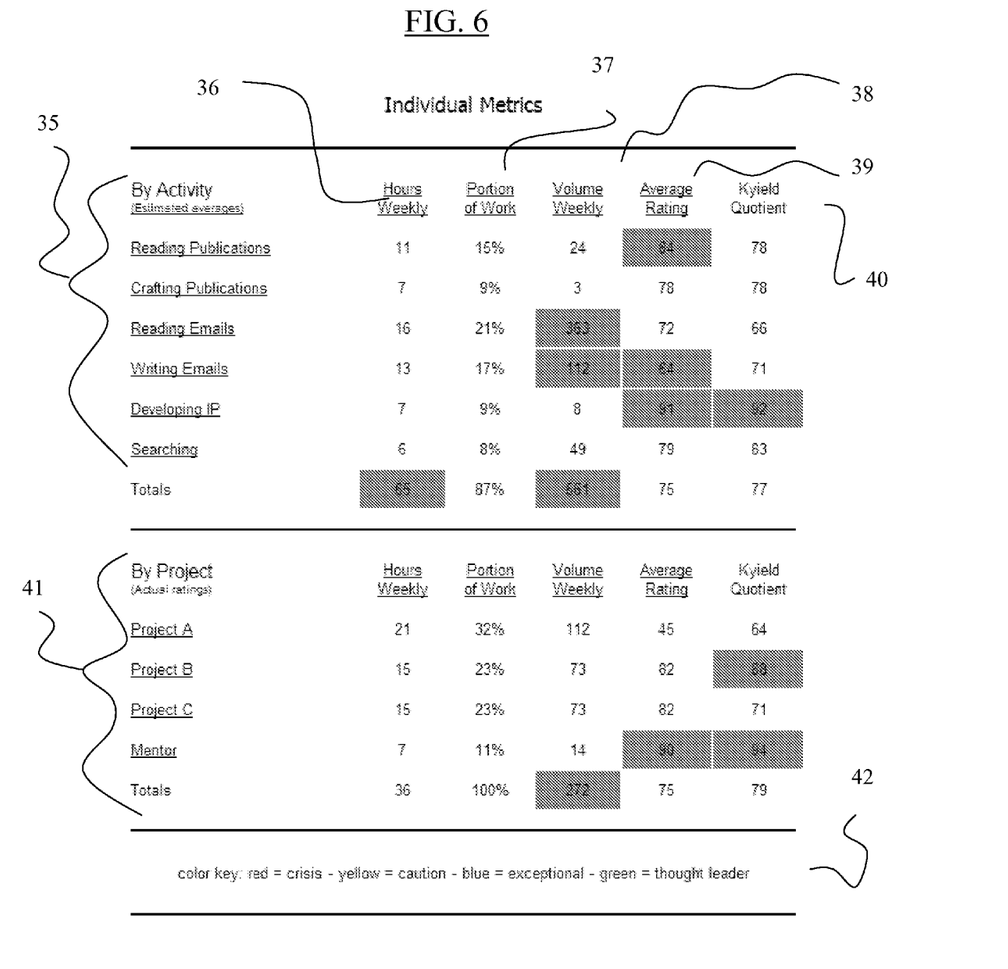
FIG. 6 is a screen capture displaying performance metrics for a hypothetical knowledge worker representing one example in which the present invention may be implemented.
Figure 7:
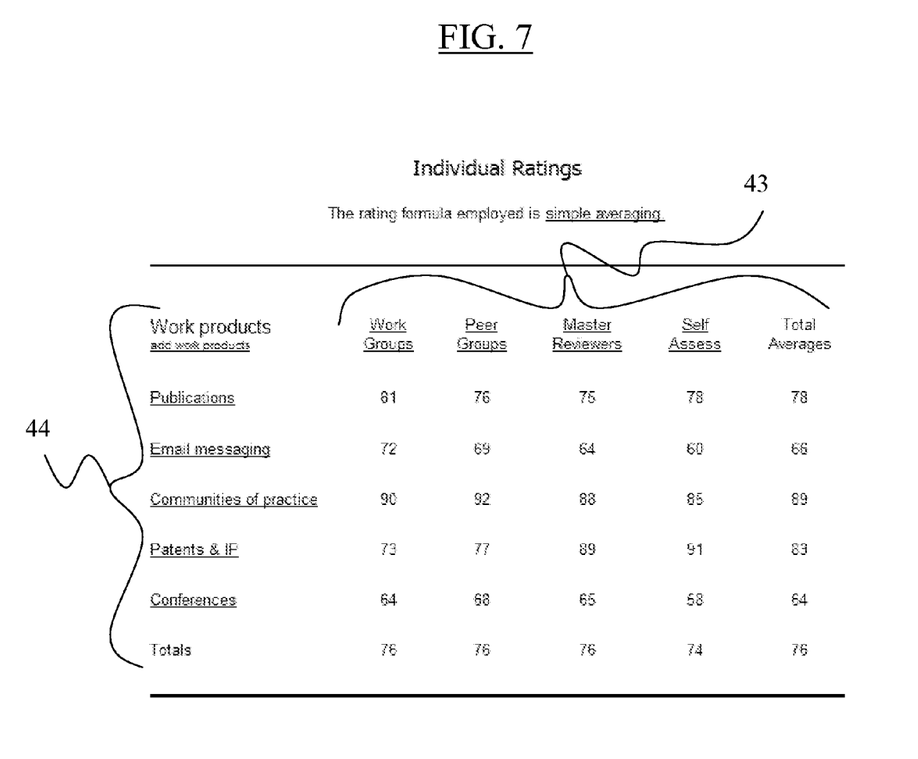
FIG. 7 is a screen capture displaying performance ratings for a hypothetical knowledge worker representing one example in which the present invention may be implemented.

With the advanced settings object 31, system members can change delivery settings, compare their metrics (35) and ratings (44), compare their metrics to system averages, request expert review of their performance, and review recommendations.

The approval options in object 32 provides for transferring existing networks into the member's approved database, ability to create a new database, or allow only approved system partners for the most restricted option. Distribution options 33 for member messaging include the approved devices in the pre-deployment survey 10, which can be restricted to a single device, all approved devices, or any combination thereof, to include file types in object 34, thus allowing the member to adapt the system to each individual's changing work patterns and tool selection.

FIG. 6 is a screen capture of the individual performance metrics by activity 35 and by project 41 for a hypothetical system member. The metrics for each activity displayed include hours weekly 36, portion of total work 37, weekly volume 38, average rating 39, and the system quotient 40, which is a proprietary formula and trade secret (not shown). The accuracy of the metrics in part is dependent upon the specific software programs used by the subject such as email and word processing, for example, and whether the actual data can be integrated. An automated estimate based on system data may be implemented if actual data is unavailable. In the preferred embodiment, the metrics are visually displayed in color code 42, highlighting areas needing improvement or deserving recognition, thus providing the option to input into an organizational compensation database or worker training courses.

FIG. 7 is a screen capture of the ratings for a hypothetical system member, as displayed in the individual module, device viewer, or browser. The member's original work products 44 are shown as rated 43 by those selected with the individual and parent modules, exemplified here in the preferred embodiment as work groups, peers, master reviewers, and self assessment. In the FIG. 7 example, simple averaging is employed. However, it is expected that subject organizations will employ pre-existing or new ratings formulas, which is reflected in the system adaptability.

Figure 8:
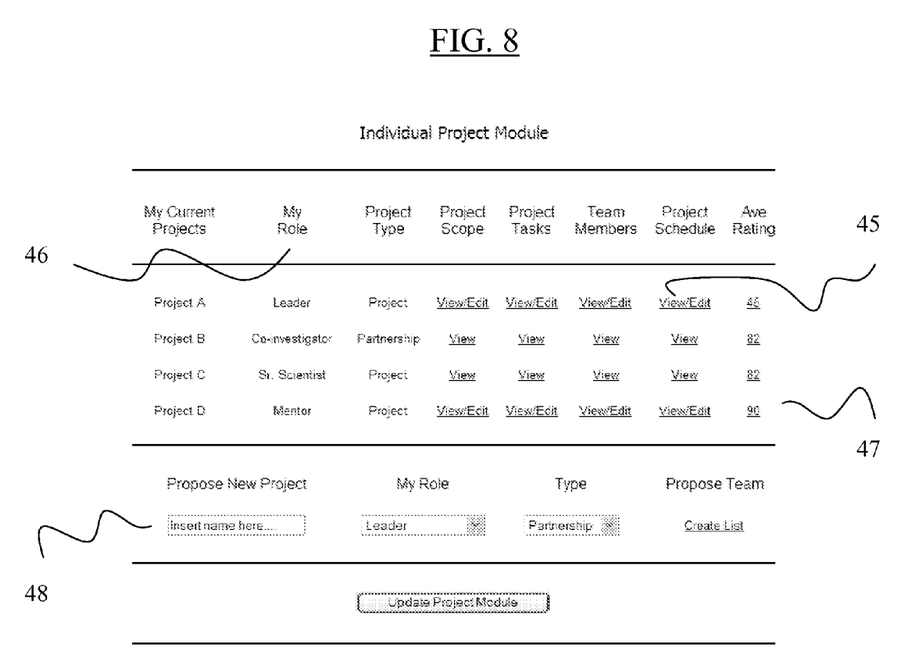
FIG. 8 is a screen capture displaying work projects for a hypothetical knowledge worker representing one example in which the present invention may be implemented.

FIG. 8 is a screen capture of the individual project module for a hypothetical system member. When the individual member proposes a new project 48, the administrator of the parent modules are automatically messaged seeking their approval. Upon approval, the role 46 of the individual is displayed which determines whether the member and module is authorized to only view the project files, or edit the project's scope, tasks, members, and schedule. Similar to other metadata files input into the system, project files are also rated 47 for the purpose of improving performance and knowledge yield.

CONCLUSION

The present invention consists of a new system inclusive of a holistic architectural method in managing the persistent duel problems of information overload combined with the disincentives for the sharing of original work in the modern computerized workplace environment.

It should be evident to those skilled in the art that the programming required to operate the system and method described herein is platform and device independent in scope and spirit, and could be applied in any modern computer network.

What is claimed is:

1. A computer implemented method employing computer networks for managing information consumption, or knowledge yield, for an organization or group of organizations, comprising of:
   (a) a survey module for performing a pre-deployment survey for receiving system data related to constraints, variables, rules and other system settings;
   (b) a self-guided knowledge module for automatically collecting and auditing data on the World Wide Web, Intranet, or wireless device based on the pre-deployment survey data;
   (c) a input module for receiving a metadata wrapper file, wherein the metadata wrapper file describes relationships in the data collected by the self-guided knowledge module;
   (d) a management module for managing data flow for the entire organization, wherein the management module manages the predetermined data quality and quantity for the entire organization;
   (e) a group module for managing data flow for each group of individuals, wherein the group module manages the predetermined quality and quantity for each group of individuals; and
   (f) and a individual module for each member to continually adjust data consumption.

2. The computer implemented method of claim 1, wherein the results of step (b) provide multiple choice responses to questions regarding the technical, operational, regulatory, subject matter, human, communications, and geographical environments of the client organization, which then automatically provide the default settings of the system for the specific subject organization or community of knowledge workers.

3. The computer implemented method of claim 1, wherein step (d) consists of a software module managed by the organization designate determines the security and regulatory settings for said system, creates and manages global curriculum and courses for members and determines which messages are mandatory versus optional.

4. The computer implemented method of claim 3 further comprising of a computer program that generates additional modules in a hierarchical or horizontal format, and defining permissions and rules of said modules.

5. The computer implemented method of claim 1, wherein step (e) consists of a software module that a business unit designate employs to create and manage course for each individual member within the group or community, sets the initial messaging volume and quality levels, determines which messages are mandatory versus optional, selects content reviewers, and defines the default search parameters according to the group and individual objectives.

6. The computer implemented method of claim 5 further comprising of computer program that generates additional modules in a hierarchical or horizontal format, and defines permissions and sets rules of said modules within the permissions.

7. The computer implemented method of claim 1, wherein step (f) consists of a software module whereby each individual member manages the quality and quantity of their personal information consumption in messaging and search returns.

8. The computer implemented method of claim 7 further comprising of a template enabling the member to upload a wrapper file to the system database, including Uniform Resource Identifier (URI) and RDF URI reference (URIref), Uniform Resource Locator (URL), Semantic relationships, file attributes, and list of requested reviewers.

* * * * *